(12) United States Patent
Itzhak-Sigron et al.

(10) Patent No.: US 10,882,231 B2
(45) Date of Patent: Jan. 5, 2021

(54) INJECTION MOLDED PANELS

(71) Applicant: KETER PLASTIC LTD., Herzliya (IL)

(72) Inventors: Reut Itzhak-Sigron, Ein Sarid (IL); Zvi Zak, Herzliya (IL)

(73) Assignee: KETER PLASTIC LTD., Herzliya (IL)

( * ) Notice: Subject to any disclaimer, the term of this patent is extended or adjusted under 35 U.S.C. 154(b) by 198 days.

(21) Appl. No.: 15/506,303

(22) PCT Filed: Aug. 27, 2015

(86) PCT No.: PCT/IL2015/050858
§ 371 (c)(1),
(2) Date: Feb. 24, 2017

(87) PCT Pub. No.: WO2016/030891
PCT Pub. Date: Mar. 3, 2016

(65) Prior Publication Data
US 2017/0246781 A1    Aug. 31, 2017

Related U.S. Application Data

(60) Provisional application No. 62/043,710, filed on Aug. 29, 2014.

(51) Int. Cl.
*B29C 45/14* (2006.01)
*D04B 21/00* (2006.01)
(Continued)

(52) U.S. Cl.
CPC ........ *B29C 45/14786* (2013.01); *B29C 45/37* (2013.01); *D04B 1/00* (2013.01);
(Continued)

(58) Field of Classification Search
CPC ... B29C 45/14786; B29C 45/37; B29C 45/14; B29K 2105/128; B29L 2007/002;
(Continued)

(56) References Cited

U.S. PATENT DOCUMENTS

D26,875 S    4/1897   Morris
D35,045 S    9/1901   Stickley
(Continued)

FOREIGN PATENT DOCUMENTS

DE    20 2005 015 230 U1   11/2006
EP         0 517 614 A1    12/1992
(Continued)

OTHER PUBLICATIONS

English translation of EP1834756 by Georg et al.*
(Continued)

*Primary Examiner* — Yan Lan
(74) *Attorney, Agent, or Firm* — Vorys, Sater, Seymour & Pease LLP; William Klima

(57) ABSTRACT

Provided is a molded panel having at least one surface resembling a knit-like pattern, said panel comprising a plurality of stitches at least partially interconnected through connecting members wherein at locations where the stitch strand and the connecting member intersect they form together an integrated, solid molded material location and wherein the panel comprises through going apertures extending therethrough.

15 Claims, 9 Drawing Sheets

(51) Int. Cl.
  *D04B 1/00* (2006.01)
  *B29C 45/37* (2006.01)
  *B29K 105/12* (2006.01)
  *B29L 7/00* (2006.01)
  *B29L 22/00* (2006.01)

(52) U.S. Cl.
  CPC ........ *D04B 21/00* (2013.01); *B29K 2105/128* (2013.01); *B29L 2007/002* (2013.01); *B29L 2022/00* (2013.01); *D10B 2403/02411* (2013.01); *D10B 2403/02412* (2013.01); *D10B 2403/033* (2013.01)

(58) Field of Classification Search
  CPC ....... B29L 2022/00; D04B 1/00; D04B 21/00; D10B 2403/02411; D10B 2403/02412; D10B 2403/033
  See application file for complete search history.

(56) References Cited

U.S. PATENT DOCUMENTS

| | | |
|---|---|---|
| D35,277 S | 11/1901 | Palmer |
| D35,753 S | 2/1902 | Palmer |
| D37,045 S | 7/1904 | MacMurray |
| D57,535 S | 4/1921 | Loewenberg |
| D62,810 S | 7/1923 | Zunino |
| D65,968 S | 11/1924 | Herbine |
| 1,532,750 A | 4/1925 | Joha |
| 1,596,716 A | 8/1926 | Clarke |
| D85,522 S | 11/1931 | Goldsmith |
| 1,917,903 A | 7/1933 | Sargent |
| 1,945,967 A | 2/1934 | Colbie |
| 1,977,265 A | 10/1934 | Colvin, Jr. |
| 2,016,005 A | 10/1935 | Giannasca |
| 2,052,088 A | 8/1936 | Drumheller |
| D102,592 S | 12/1936 | Klaff |
| D104,981 S | 6/1937 | Munz |
| D107,278 S | 11/1937 | Grossman et al. |
| D109,069 S | 3/1938 | Matassa |
| 2,124,574 A | 7/1938 | Hesse |
| D125,058 S | 2/1941 | Ratner |
| D130,390 S | 11/1941 | Tips |
| D136,044 S | 7/1943 | Becker et al. |
| 2,396,912 A | 3/1946 | Campbell |
| 2,625,020 A | 1/1953 | Oliver |
| 2,641,299 A | 6/1953 | Bloom et al. |
| D172,633 S | 7/1954 | Niemann |
| D177,896 S | 6/1956 | Capraro et al. |
| D177,938 S | 6/1956 | Rosenberg |
| D181,995 S | 1/1958 | Odor, Jr. |
| D184,730 S | 3/1959 | Harty, Jr. |
| D196,598 S | 10/1963 | Lewis |
| 3,125,976 A | 3/1964 | Birmingham |
| 3,142,936 A | 8/1964 | Tweddell |
| 3,180,385 A | 4/1965 | Kuroda |
| D201,422 S | 6/1965 | Lyon |
| D213,976 S | 4/1969 | Platner |
| 3,443,715 A | 5/1969 | Edwards |
| 3,488,415 A * | 1/1970 | Patchell et al. ......... B29C 59/04 264/154 |
| D221,135 S | 7/1971 | Scherer et al. |
| D222,624 S | 11/1971 | Gianfagna |
| D224,685 S | 8/1972 | Michlap et al. |
| D224,792 S | 9/1972 | Knox, Jr. |
| D225,501 S | 12/1972 | Apple, Jr. |
| D230,760 S | 3/1974 | Wilkinson |
| 3,814,058 A | 6/1974 | Thompson |
| D234,477 S | 3/1975 | Lockhardt et al. |
| 3,910,075 A | 10/1975 | Holliday |
| 3,939,338 A | 2/1976 | Giammalvo |
| D240,173 S | 6/1976 | Young |
| D242,941 S | 1/1977 | Nagata |
| 4,002,368 A | 1/1977 | Ortize |
| 4,057,210 A | 11/1977 | Wellman |
| 4,156,308 A | 5/1979 | Gebhart |
| D254,127 S | 2/1980 | Sgroi |
| D256,110 S | 7/1980 | Dunbar et al. |
| D263,531 S | 3/1982 | Hanson |
| D271,091 S | 10/1983 | Peterson |
| 4,416,370 A | 11/1983 | Beall |
| 4,514,995 A | 5/1985 | Curtis et al. |
| D285,874 S | 9/1986 | McCaffrey |
| D286,606 S | 11/1986 | Curtis et al. |
| D287,421 S | 12/1986 | Scaggs |
| D290,544 S | 6/1987 | Babicki |
| D305,271 S | 12/1989 | Yoshikawa |
| D312,736 S | 12/1990 | Grosfillex |
| 5,144,780 A | 9/1992 | Gieling et al. |
| 5,188,063 A | 2/1993 | Evans |
| D336,378 S | 6/1993 | Kittridge |
| D339,002 S | 9/1993 | Wong |
| D342,163 S | 12/1993 | Lesner |
| D344,856 S | 3/1994 | Gehry |
| D351,266 S | 10/1994 | Licari |
| 5,356,024 A | 10/1994 | Ho et al. |
| D353,237 S | 12/1994 | Banker |
| D355,077 S | 2/1995 | Tegner |
| D356,523 S | 3/1995 | Rahr |
| 5,450,691 A | 9/1995 | Christie et al. |
| D363,823 S | 11/1995 | Ricchio, Jr. |
| D366,772 S | 2/1996 | Pasin |
| D373,257 S | 9/1996 | Hutton |
| D378,788 S | 4/1997 | Tihany |
| D379,269 S | 5/1997 | Hutton |
| 5,645,504 A | 7/1997 | Westhoff |
| 5,650,214 A | 7/1997 | Anderson et al. |
| D383,646 S | 9/1997 | Jeppesen et al. |
| D384,211 S | 9/1997 | Wied et al. |
| D388,647 S | 1/1998 | Odell |
| D389,621 S | 1/1998 | Short et al. |
| D390,359 S | 2/1998 | Lacy |
| D390,360 S | 2/1998 | Longaberger |
| D393,548 S | 4/1998 | Garneau |
| D394,415 S | 5/1998 | Chen |
| 5,765,502 A | 6/1998 | Haugh |
| D396,748 S | 8/1998 | Dodds |
| D396,826 S | 8/1998 | Weder et al. |
| 5,795,835 A | 8/1998 | Bruner et al. |
| D398,348 S | 9/1998 | Hogan |
| 5,807,793 A | 9/1998 | Scari et al. |
| D400,015 S | 10/1998 | Hutton |
| D406,470 S | 3/1999 | Lin |
| D406,480 S | 3/1999 | Lin |
| D416,683 S | 11/1999 | Lacy et al. |
| D421,323 S | 2/2000 | Douglas et al. |
| D421,853 S | 3/2000 | Black |
| D422,156 S | 4/2000 | Black |
| D422,422 S | 4/2000 | Black |
| D426,386 S | 6/2000 | Lacy et al. |
| 6,073,468 A | 6/2000 | Wallace |
| D427,791 S | 7/2000 | Peterson |
| D428,269 S | 7/2000 | Peterson |
| D431,099 S | 9/2000 | Douglas |
| D431,117 S | 9/2000 | Hutton |
| D431,118 S | 9/2000 | Hutton |
| D432,806 S | 10/2000 | Gomez |
| D436,697 S | 1/2001 | Fiore et al. |
| D440,415 S | 4/2001 | Bellini |
| D440,722 S | 4/2001 | Walker |
| D446,016 S | 8/2001 | Dinan et al. |
| D453,865 S | 2/2002 | Ross |
| D457,280 S | 5/2002 | Sofy |
| D458,450 S | 6/2002 | Lacy et al. |
| D459,889 S | 7/2002 | Lacy et al. |
| D461,340 S | 8/2002 | Walters, III |
| D461,342 S | 8/2002 | Spitler |
| D463,666 S | 10/2002 | Williamson et al. |
| D463,913 S | 10/2002 | Lacy et al. |
| D463,921 S | 10/2002 | Shillam |
| D464,199 S | 10/2002 | Lacy et al. |
| D465,341 S | 11/2002 | Hutton |
| D465,662 S | 11/2002 | Hutton |
| D466,301 S | 12/2002 | Sofy |

(56) References Cited

U.S. PATENT DOCUMENTS

| | | |
|---|---|---|
| D471,015 S | 3/2003 | Lacy et al. |
| D476,161 S | 6/2003 | Salway et al. |
| D477,918 S | 8/2003 | Bruner et al. |
| D478,217 S | 8/2003 | Bruner et al. |
| D486,966 S | 2/2004 | Steendyk |
| D505,276 S | 5/2005 | Cronk et al. |
| D509,106 S | 9/2005 | De Groote et al. |
| D515,222 S | 2/2006 | Kieffer |
| D522,183 S | 5/2006 | Wylie |
| D526,122 S | 8/2006 | Dodds |
| D526,754 S | 8/2006 | Hardy et al. |
| D537,753 S | 3/2007 | Belokin |
| 7,201,024 B2 | 4/2007 | Hirayama et al. |
| D543,326 S | 5/2007 | Dretzka |
| D545,071 S | 6/2007 | Potter |
| D546,590 S | 7/2007 | Frinier |
| D549,470 S | 8/2007 | Hutton |
| D550,465 S | 9/2007 | Bouroullec et al. |
| D550,912 S | 9/2007 | Kempske et al. |
| D551,445 S | 9/2007 | Peller et al. |
| D557,509 S | 12/2007 | Davis et al. |
| D557,524 S | 12/2007 | Simpson |
| D562,033 S | 2/2008 | Lowsky |
| D562,975 S | 2/2008 | Otto et al. |
| D565,356 S | 4/2008 | Mellen et al. |
| D568,106 S | 5/2008 | Karam |
| D569,111 S | 5/2008 | Swanson |
| D572,534 S | 7/2008 | Karam |
| D573,807 S | 7/2008 | Marin et al. |
| D579,217 S | 10/2008 | Cramer et al. |
| D579,676 S | 11/2008 | Rheault et al. |
| D584,020 S | 12/2008 | McNamara |
| D584,069 S | 1/2009 | Guinochet |
| D585,786 S | 2/2009 | Newman-Schwartz |
| D586,124 S | 2/2009 | Knutson et al. |
| D587,912 S | 3/2009 | Moss |
| D588,366 S | 3/2009 | Wang |
| D589,263 S | 3/2009 | Wang |
| D589,664 S | 3/2009 | Simas |
| D596,355 S | 7/2009 | Toltzman et al. |
| D597,311 S | 8/2009 | Knutson et al. |
| D598,323 S | 8/2009 | Bradley et al. |
| D599,141 S | 9/2009 | Massaud |
| D600,048 S | 9/2009 | Weissenrieder |
| D602,299 S | 10/2009 | Heroux |
| D605,367 S | 12/2009 | Northrop |
| D606,337 S | 12/2009 | Lee |
| D611,706 S | 3/2010 | Angles et al. |
| D611,736 S | 3/2010 | Navone |
| D612,546 S | 3/2010 | Zine |
| D614,991 S | 5/2010 | White |
| D619,852 S | 7/2010 | Bodum |
| D632,026 S | 2/2011 | Higashi et al. |
| D633,283 S | 3/2011 | Choi |
| D634,165 S | 3/2011 | Yang |
| 7,902,420 B2 | 3/2011 | Kase |
| D636,701 S | 4/2011 | White |
| D636,702 S | 4/2011 | White |
| D636,703 S | 4/2011 | White |
| 7,935,207 B2 | 5/2011 | Zhao et al. |
| D643,583 S | 8/2011 | Duvigneau |
| D643,585 S | 8/2011 | Duvigneau |
| D644,846 S | 9/2011 | Ciani et al. |
| D648,542 S | 11/2011 | Diventi |
| D648,545 S | 11/2011 | Diventi |
| D648,546 S | 11/2011 | Diventi |
| D648,547 S | 11/2011 | Diventi |
| D655,088 S | 3/2012 | Lee |
| D657,148 S | 4/2012 | Ciani et al. |
| D657,966 S | 4/2012 | Foersom et al. |
| D663,552 S | 7/2012 | Hughes et al. |
| D663,553 S | 7/2012 | Pedersen et al. |
| D664,778 S | 8/2012 | Pheasant et al. |
| D670,916 S | 11/2012 | Yang |
| D675,844 S | 2/2013 | Cramer et al. |
| D676,613 S | 2/2013 | Chiu |
| D677,014 S | 2/2013 | Duvigneau |
| D677,486 S | 3/2013 | Cramer et al. |
| D679,104 S | 4/2013 | Pouzet |
| D681,356 S | 5/2013 | Iwasaki |
| D681,357 S | 5/2013 | Sjostrand et al. |
| D684,297 S | 6/2013 | Lin et al. |
| D687,629 S | 8/2013 | Fiedler et al. |
| D687,639 S | 8/2013 | Grotta et al. |
| D689,333 S | 9/2013 | Karam |
| D690,891 S | 10/2013 | Barre et al. |
| D691,341 S | 10/2013 | Barre et al. |
| D692,551 S | 10/2013 | Wirz |
| D693,136 S | 11/2013 | Lee |
| D693,605 S | 11/2013 | Rasenberg et al. |
| D698,909 S | 2/2014 | Chou |
| D700,448 S | 3/2014 | Burks |
| D702,051 S | 4/2014 | Rasenberg et al. |
| D702,449 S | 4/2014 | Puotiniemi |
| D703,960 S | 5/2014 | Doyle et al. |
| D704,432 S | 5/2014 | Askaroff |
| D706,063 S | 6/2014 | Arnon et al. |
| D706,507 S | 6/2014 | Duvigneau |
| D706,508 S | 6/2014 | Duvigneau |
| D707,373 S | 6/2014 | Nugent |
| D709,655 S | 7/2014 | Lipscomb |
| D710,631 S | 8/2014 | Pirayesh et al. |
| D717,203 S | 11/2014 | Thuma et al. |
| D719,733 S | 12/2014 | Liu |
| D720,143 S | 12/2014 | Barber et al. |
| D722,745 S | 2/2015 | Richards |
| D724,321 S | 3/2015 | Liu |
| D726,460 S | 4/2015 | Arnon et al. |
| D726,971 S | 4/2015 | Itzhak-Sigron et al. |
| D727,106 S | 4/2015 | Lai |
| D728,938 S | 5/2015 | Vaccarella |
| D728,939 S | 5/2015 | Suomela |
| D729,370 S | 5/2015 | Chou |
| D729,559 S | 5/2015 | Morten |
| D734,078 S | 7/2015 | Bougay |
| D734,206 S | 7/2015 | Thuma et al. |
| D738,140 S | 9/2015 | Bartelmuss |
| D739,296 S | 9/2015 | Thuma et al. |
| D740,577 S | 10/2015 | Cohen |
| D744,261 S | 12/2015 | Rauch |
| D745,280 S | 12/2015 | Wang |
| D745,785 S | 12/2015 | Cohen |
| D746,593 S | 1/2016 | Kroll |
| D747,904 S | 1/2016 | Haynes |
| D749,864 S | 2/2016 | Cohen |
| D756,668 S | 5/2016 | Blythe et al. |
| D757,466 S | 5/2016 | Kroll |
| D758,802 S | 6/2016 | Bodum |
| D762,405 S | 8/2016 | Werner |
| D763,603 S | 8/2016 | Bartelmuss |
| D765,398 S | 9/2016 | Vaccarella |
| D767,904 S | 10/2016 | Lin |
| D772,590 S | 11/2016 | Itzhak-Sigron et al. |
| D773,125 S | 11/2016 | Itzhak-Sigron et al. |
| D773,749 S | 12/2016 | Itzhak-Sigron et al. |
| D773,837 S | 12/2016 | Bougay et al. |
| D776,926 S | 1/2017 | Duvigneau |
| D776,927 S | 1/2017 | Duvigneau |
| D776,928 S | 1/2017 | Duvigneau |
| D777,431 S | 1/2017 | Duvigneau |
| D777,432 S | 1/2017 | Duvigneau |
| D777,434 S | 1/2017 | Duvigneau |
| D777,485 S | 1/2017 | Bougay |
| D788,466 S | 6/2017 | Duvigneau |
| D791,482 S | 7/2017 | Itzhak-Sigron et al. |
| D793,731 S | 8/2017 | Duvigneau |
| D798,074 S | 9/2017 | Itzhak-Sigron et al. |
| D812,944 S | 3/2018 | Itzhak-Sigron et al. |
| D812,948 S | 3/2018 | Itzhak-Sigron et al. |
| D814,967 S | 4/2018 | Itzhak-Sigron et al. |
| D816,349 S | 5/2018 | Itzhak-Sigron et al. |
| D818,720 S | 5/2018 | Itzhak-Sigron et al. |
| D824,179 S | 7/2018 | Itzhak-Sigron et al. |
| D824,621 S | 7/2018 | Duvigneau |

(56) References Cited

U.S. PATENT DOCUMENTS

| | | |
|---|---|---|
| D825,197 S | 8/2018 | Itzhak-Sigron et al. |
| D830,711 S | 10/2018 | Itzhak-Sigron et al. |
| D830,890 S | 10/2018 | Itzhak-Sigron et al. |
| 2005/0087142 A1 | 4/2005 | Dalal et al. |
| 2005/0204448 A1 | 9/2005 | Wise et al. |
| 2006/0163039 A1 | 7/2006 | Marshall et al. |
| 2006/0288943 A1 | 12/2006 | Ku |
| 2007/0051323 A1 | 3/2007 | Guard |
| 2008/0075944 A1 | 3/2008 | Kajioka et al. |
| 2008/0108466 A1 | 5/2008 | Pelton |
| 2008/0282987 A1 | 11/2008 | Ritchey |
| 2009/0021939 A1 | 1/2009 | Costello et al. |
| 2010/0266831 A1 | 10/2010 | Durie et al. |
| 2014/0220332 A1 | 8/2014 | Rommel et al. |
| 2014/0287643 A1 | 9/2014 | Nozaki et al. |
| 2014/0367397 A1 | 12/2014 | Audet et al. |
| 2017/0246781 A1 | 8/2017 | Itzhak-Sigron et al. |

FOREIGN PATENT DOCUMENTS

| | | |
|---|---|---|
| EP | 1 767 330 A2 | 3/2007 |
| EP | 1 834 756 A1 | 9/2007 |
| EP | 1834756 * | 5/2011 |
| EP | 2 845 709 A2 | 3/2015 |
| JP | 2003-221765 A | 8/2003 |
| JP | 2003-250667 A | 9/2003 |
| JP | 2008-73938 A | 4/2008 |
| JP | 2014-124446 A | 7/2014 |
| WO | 2016/021239 A1 | 2/2016 |

OTHER PUBLICATIONS

Hegde et al., "Thermal Bonding of Polypropylene Films and Fibers", J Appl Polym Sci, vol. 110, pp. 3047-3058, (2008).

Michielsen et al., "Thermal Bonding of Nonwovens as Simulated by Polypropylene Films: Effect of Time, Temperature, and Molecular Weight", J Appl Polym Sci, vol. 117, pp. 3322-3330, (2010).

* cited by examiner

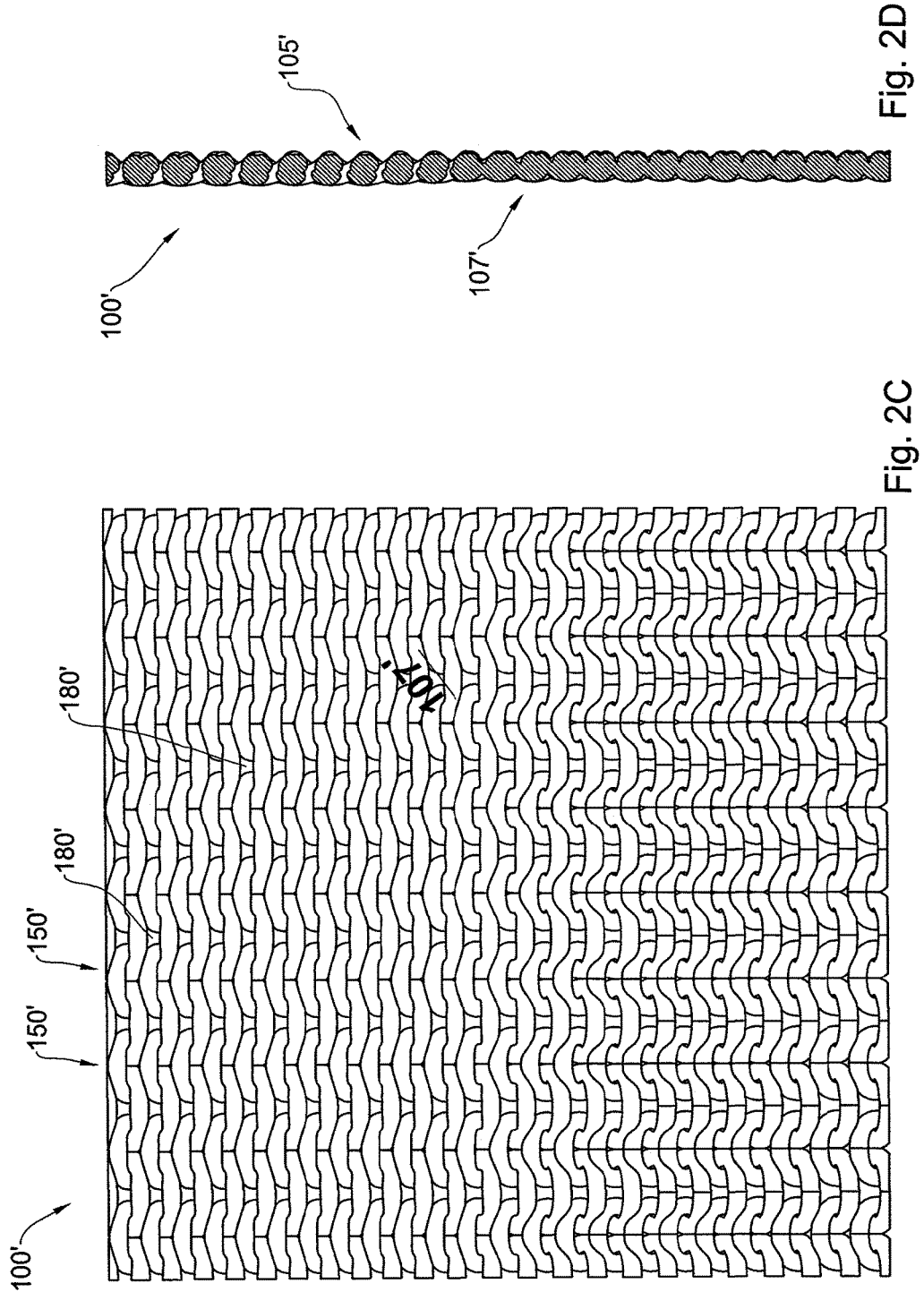

INJECTION MOLDED PANELS

TECHNOLOGICAL FIELD

The disclosed subject matter relates to injection molded panels and articles comprising such panel. In particular, the subject matter relates to injection molded panels and articles comprising a knit-like surface.

BACKGROUND OF THE DISCLOSED SUBJECT MATTER

Various types of knitted articles are known in the art. Such articles are typically knitted from various yarns, textiles, fabrics, and plastic strands etc. Moreover, knitted articles are at times reinforced to assume a three dimensional erect configurations. Such reinforcements are typically obtained by way of fabric stiffeners, glues, epoxy, plastics etc. Knitted erected articles are also obtained by tight knitting, using yarns having thickness sufficient to hold the knit in a tight configuration. With the appeal of the knitted patterns gaining attention, there are also various prior art products having prints or embossing of knit patterns thereon.

GENERAL DESCRIPTION

It is an object of the present disclosed subject matter to provide a panel manufactured in an injection molding process, which panel resembles a knitted sheet material. In another object of the disclosed subject matter manufacture of furniture items or various articles comprising at least a panel portion, which panel portion resemble a knitted panel. The panels can be planar or non planar.

A panel of the disclosed subject matter can have two similar faces, namely where both faces thereof mimic a knitted surface ('knit-like surface'), or the two faces each mimicking a different pattern of knitted surface, or where one face thereof mimics a pattern of knitted surface and another face thereof is a flat face (typically where it is a non-visualized surface; or as a watertight panel).

It will be appreciated that as tight as may be a machine or manually knitted panel, typically it has fine gaps between at least several neighboring knit stitched/eyelets. Thus, a panel according to the disclosed subject matter is formed with such gaps too, thus giving rise to 'see-through' gaps or openings at least in one dimension.

Furthermore, a typical knitted panel must be supported/anchored/wrapped/tensioned about an anchoring structure or covered with a hardening agent e.g. plastic, epoxy, glue etc. to provide it with rigidity sufficient to form a rigid, erect, stand alone article. However, according to the disclosed subject matter, the panel is a stand-alone type, i.e., free of any anchoring structure or members and wherein a frame can be integrally molded with the panel as an ornamental element or as a reinforcing element.

Accordingly, the panel may have any desired pattern and borders and may be molded in different three-dimensional shapes and patterns as complete furniture articles or as parts thereof.

Furthermore, unlike in knitted articles, detaching/tearing or loosening of one or more of the knit stitches or portions of the knitting "strand" will not result in further unraveling of the artificial panel, as there is no single strand forming the knitted panel. This arrangement results in that forces over the knit stitches and their interconnecting strands are substantially homogenously distributed.

According to the present invention, where two stitches or strands forming part to stitches, intersect they form together a solid molded material location (i.e., with no space therebetween and thus being un-detachable from one another at that location), however a gap can extend between at least part of the strands forming the knit stitches and a through going opening can extend between the strands of knitted stitches, at both sides thereof. The nature of the panel according to the disclosed subject matter is such that at said solid molded material locations the thickness of material can be equal, less or more than the accumulating thickness of the strands overlapping each other.

The intersecting strands of the stitches of a panel according to the disclosed subject matter are integrally molded at intersections, i.e., moldingly articulated to one another or detached from one another.

In accordance with the disclosed subject matter, the knit-like sheet material comprises a knit-like surface having an axial stability. The knit-like sheet material maintains its knit-like pattern having generally same geometrical structure when deformed, e.g. bended, curved, etc. the knit-like sheet comprises a base layer and a three dimensional tactile layer at least on its one side, providing the sheet with its knit-like visual effect. At least the tactile layer in accordance with the discloses subject matter resembles a yarn knitted stitches in any desired knitting pattern, e.g. formed by a plurality of knit and purl stitches in various combinations. The base layer in accordance with the disclosed subject matter is at least partially perforated, e.g. is net like. Such a configuration, provides for a general appearance of a knitted sheet, having through going openings at least in one direction. The base layer is at least partially constituted by at least the connecting members extending between the stitches at least in each row.

The axial stability of the knit-like structure prevents deformation of the knit-like pattern and maintains it in substantially same geometry and dimensions. While the knit patterns are typically formed from one continuous strand, deformation of yarn knitted sheets, e.g. stretching in any axial direction, will deform the knit stitches as the yarn leaves its original position. In accordance with the disclosed subject matter, when the knit-like molded sheet is deformed in any axial direction, the knit stitches remain in generally same configuration and thus maintain their geometrical shape.

The knit-like sheet material in accordance with the disclosed subject matter can form part of any article, e.g. 2D, 3D. The article can be a surface rug, a placemat, a plant pot, a container, a vase, a seating surface such as a pouf or cushion seat etc.

The sheet material and articles in accordance with the disclosed subject matter can be formed from plastic, polymeric material, metal, silicone, rubber or any composite material suitable for molding process, such as injection molding, cast molding, blow molding or similar processes allowing for relatively quick production of the sheet material or articles in accordance with the disclosed subject matter.

This general description has been provided so that the nature of the disclosed subject matter can be generally understood without being limited to a specific example. A more complete understanding of the invention can be obtained by reference to the following detailed description of the examples thereof in connection with the attached drawings.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which:

FIG. 1A is a top perspective view, FIGS. 1A and 1B illustrate the bottom and top sides of the sheet, respectively, FIG. 1D illustrates the sheet material in a cross section along the lines A-A viewed in the direction of arrow C, and, FIG. 1E illustrates the sheet material is a cross section along the lines B-B;

FIGS. 2A and 2C illustrate a portion of a top view and a bottom view, respectively, of a sheet material in accordance with another example of he disclosed subject matter;

FIGS. 2B and 2D illustrate the sheet material in two cross sections, taken along the lines A-A and B-B, respectively;

DETAILED DESCRIPTION OF EMBODIMENTS

FIGS. 1A to 1E are illustrating examples of a portion of a sheet material panel in accordance with the disclosed subject matter. The sheet material or panels are a unitary molded item manufactured in a single molding process. In accordance with an example of the disclosed subject matter, the articles having a knit like appearance can also be unitary molded items manufactured in a single molding process.

Figure 2A:
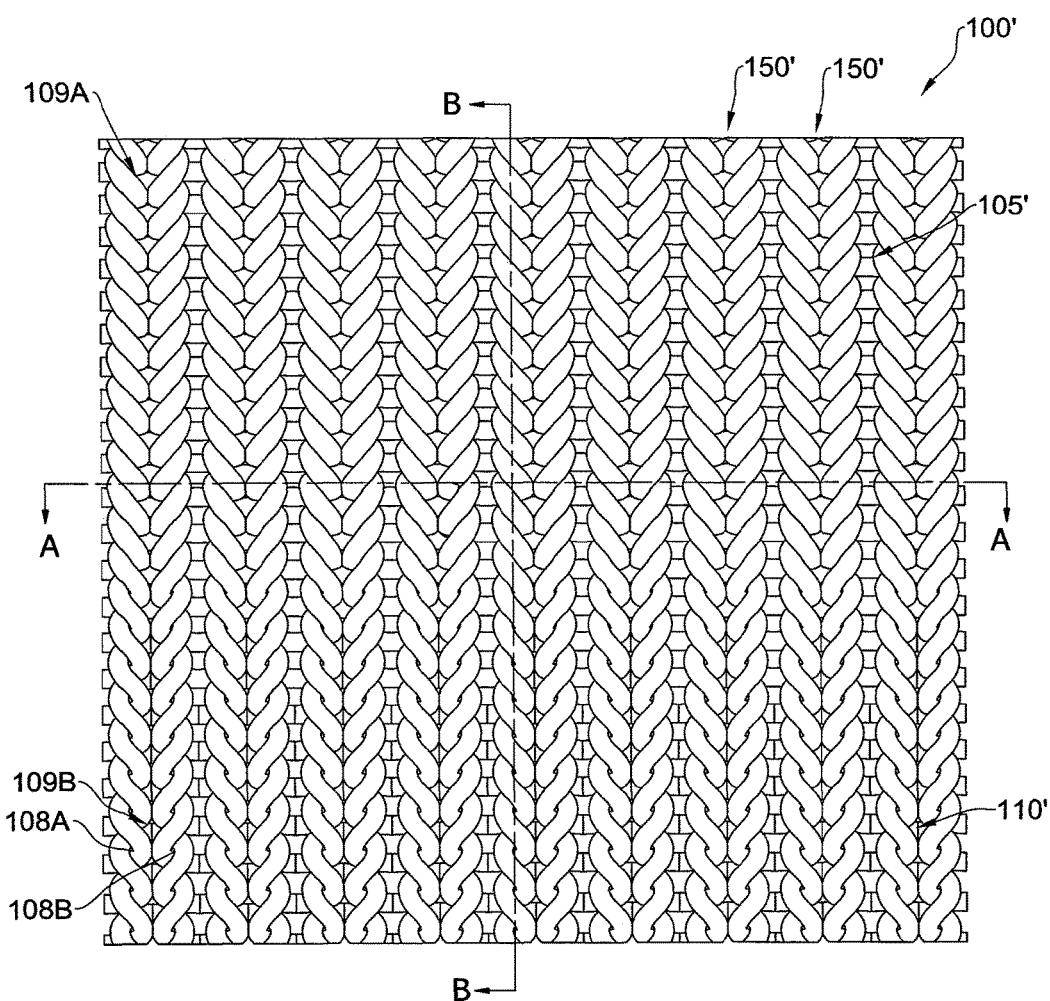

Furthermore, as can clearly be seen in the exemplifying illustrations stitches mimicking knitted pattern are of substantially circular cross-section whereas in FIG. 2A the bottom side of the panel is flattened though having at least a rounded face to the stitches extending at the top surface, i.e., mimicking knit pattern. It will be thus appreciated that any sort of knit-like pattern may be used and even more so the texture and color of the mimicking strands is in fact unlimited and may vary between natural color and texture to any other entity colors and texture, as well as cross sections of the strands, which can be rectangular, polygonal or of any other shape in a cross section. Still, it is to be appreciated that the panels with which the present invention is concerned are by no means restricted to planar panels, but rather any form of article can be formed as will be further discussed, e.g. with reference to FIGS. 3 to 5.

Figure 1A:
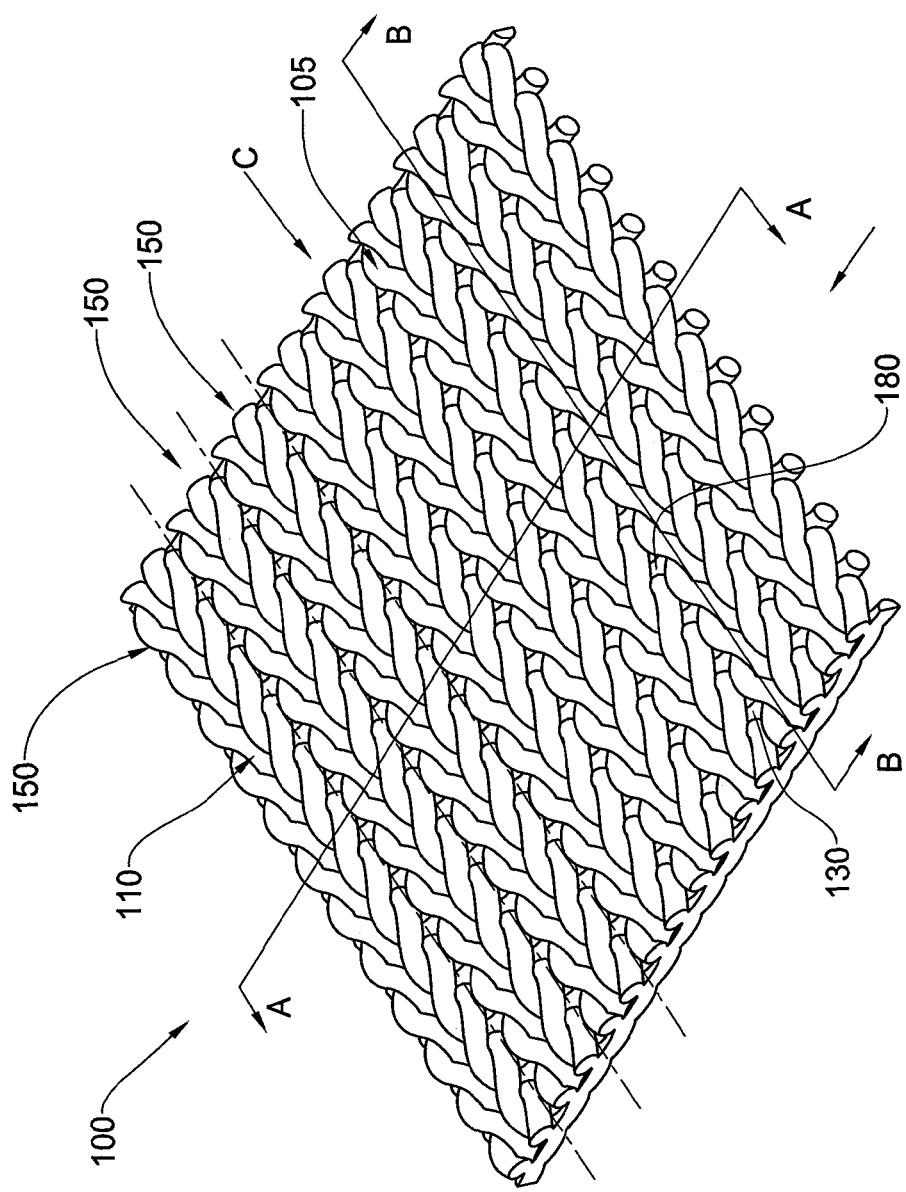
FIGS. 1A to 1E illustrate a portion of a sheet material in accordance with a disclosed subject matter, where
Figure 1B:
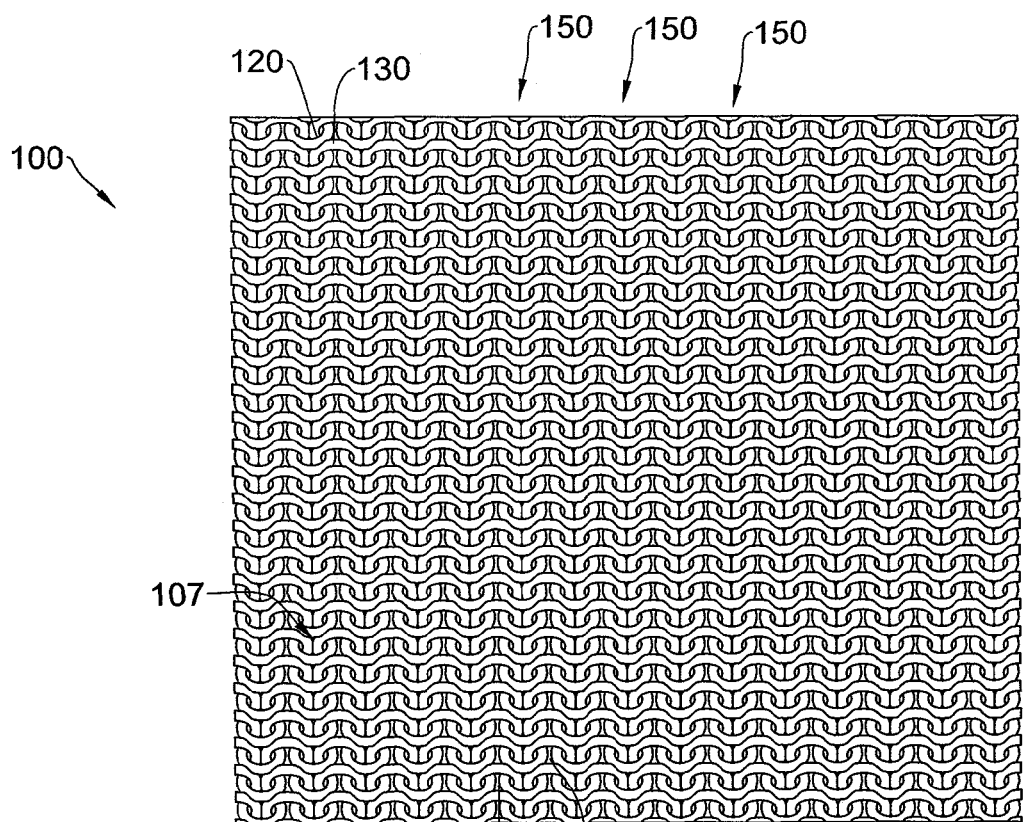
Figure 1C:
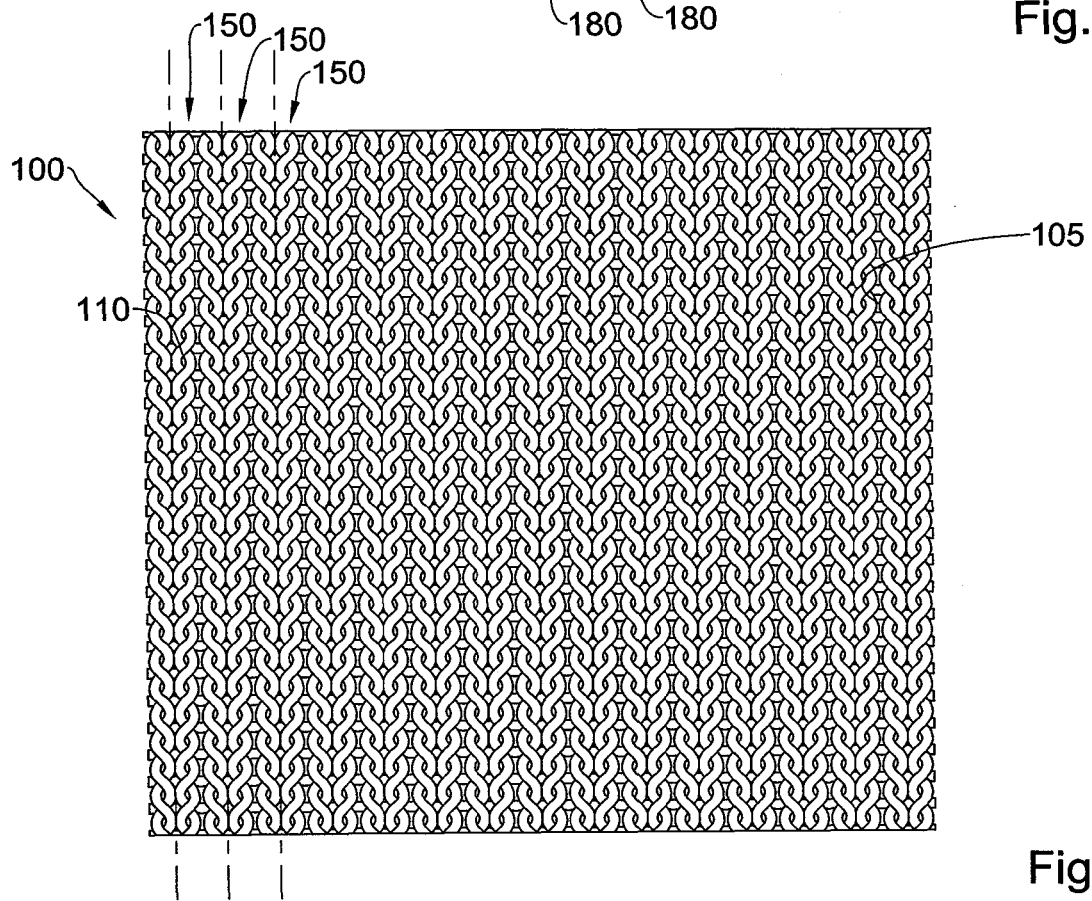
Figure 1D:
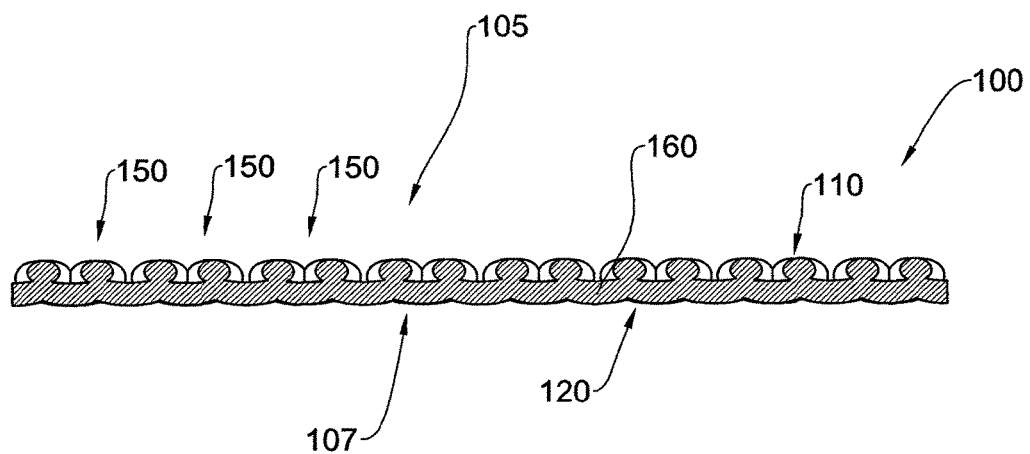
Figure 1E:
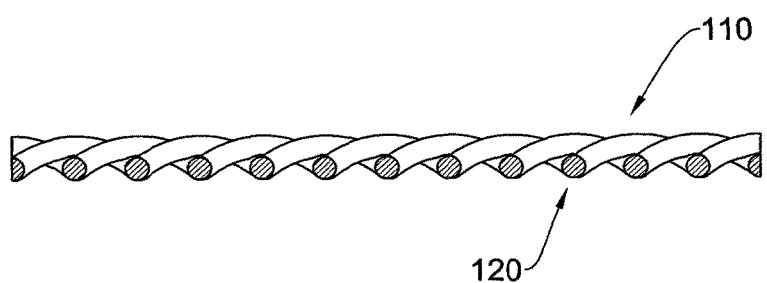

The sheet material panel in FIG. 1A is a knit-like plastic injection molded panel generally designated 100 having a top side 105 and a bottom side 107, comprising longitudinally extending in a column knit stitches 110 extending in a knit like pattern in continuous longitudinal strips 150, each strip\column shown with dashed lines extending longitudinally at its opposite sides. The strips are interconnected by transversely extending connecting members 130 extending between corresponding stitches 110 (and 120 on the opposite side) in the two stripes 150 i.e. in each row, as in a natural knit work. Top side 105 of the panel resembles a knit stitch 110 pattern (seen in FIG. 1C) and the bottom side 107 resembles a purl stitch 120 pattern (seen in FIG. 1B).

Figure 2B:
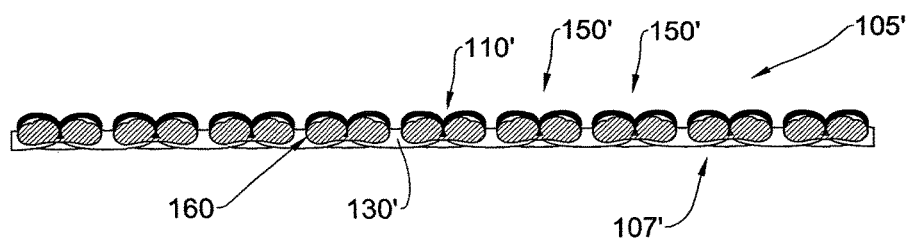

In accordance with the disclosed subject matter the molded knit-like sheet material 100 has an axial stability. As seen in e.g. in FIGS. 1D and 2B, the knit-like molded panel 100\100' comprises a base layer 160 and a three dimensional, protruding from the base layer tactile layer constituted by the stitch patterns on the top side 105 of the sheet 100 and a corresponding to the natural knit pattern a three dimensional knit like surface at the bottom side 107, providing the sheet with its knit-like visual effect. The base layer provides the panel with its structural continuity. The panel in FIG. 2 resembles that of FIG. 1, with the numerals identifying same elements marked by "'" in FIG. 2. The main differences between the two panels reside in the panel of FIG. 2 having only one tactile layer disposed at its top surface 105' and with the knit stitches on the tactile layer, having a gradually extending spacing in each stitch 110' of the same longitudinal strap 150', e.g. stitch 109A having a tighter appearance of the stitch as no spacing is provided between the strand portions forming the stitch while the stitch 109B, having openings 108A and 108B, formed between the strand portions of each consecutive two stitches in a column and which would not be possible to obtain in a natural knit work, as the strands would be loosened and the shape of the strand would deform. This is mainly facilitated by the provision of the base layer 160 which forms a substrate for carrying the tactile layer having a varying knit pattern.

The base layer 160 in accordance with the disclosed subject matter is at least partially perforated, e.g. is net like, the net being constituted by the interconnecting strands, e.g. the connecting members 130 which at the locations of the interconnections, form together solid, inseparable connecting points and at least the space in-between the connecting members constitutes the openings of the net. This is seen at least in FIGS. 1D and 1E, the base layer is at least partially constituted by the interconnected strands further forming the knit stitch patterns at the top and bottom surfaces, such that at the locations devoid the knit stitches, the transversely extending connecting members form a part of the base layer. While in the present example the stitches are mimicked on both sides of the panel, as seen in FIGS. 2A to 2D and discussed above, only one side of the base is provided with a three dimensional tactile layer, such that the bottom surface of the panel remains substantially flat. However, in accordance with the disclosed subject matter, to provide for the knit-like appearance, the longitudinal strips of knit stitch columns are interconnected by transversely extending connecting members 130. Thus, as in the example of FIG. 1, the transversely extending connecting members are spaced apart in the longitudinal direction, giving rise to the openings 180 going through the panel. As seen at least in FIG. 2A, such a configuration, provides for a general appearance of a knitted sheet, having spacing between the stitch columns.

Figure 3:
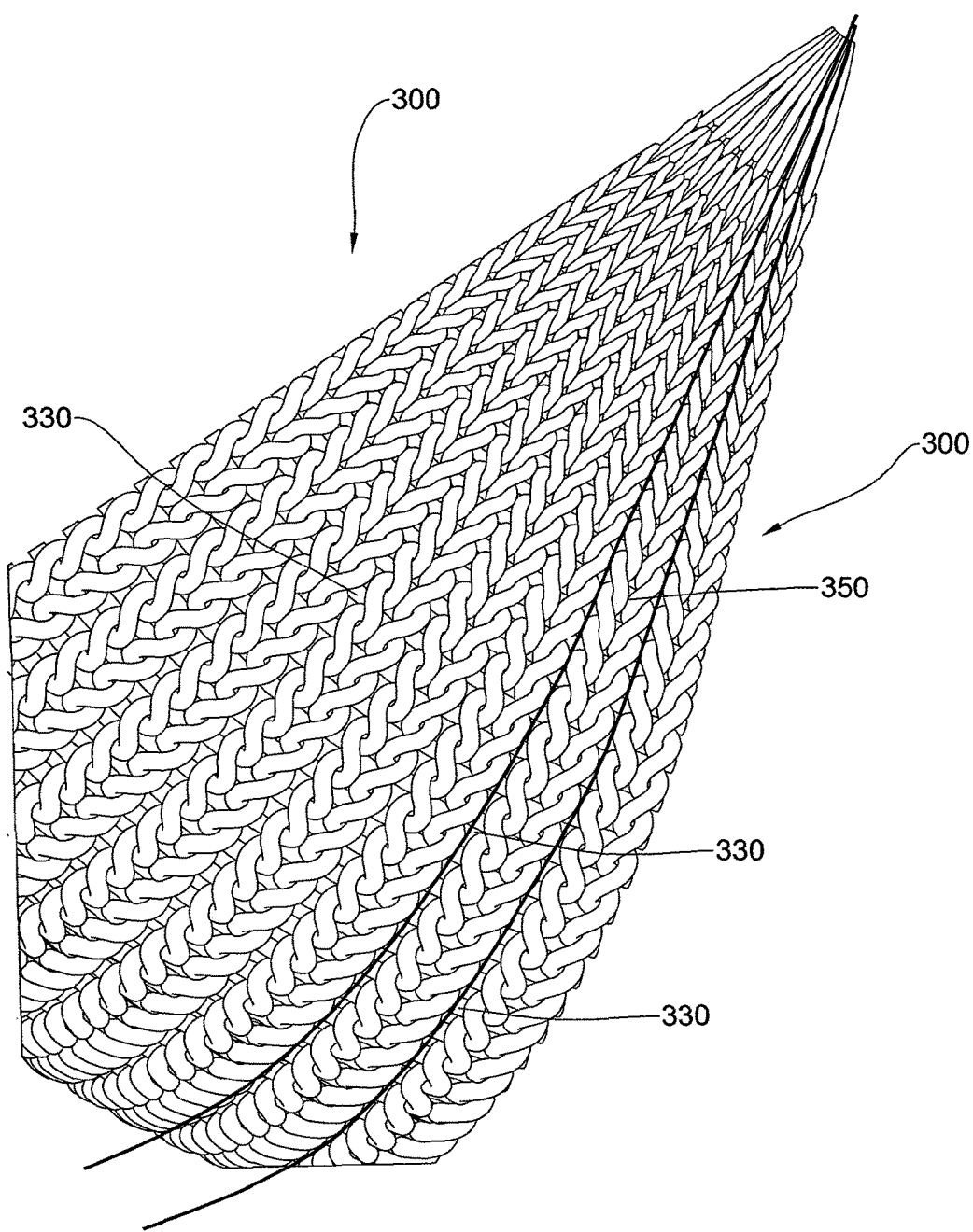
FIG. 3 illustrates a section of a curved sheet material in accordance with yet and example of the disclosed subject matter, the segment marked A in FIG. 4A.
Figure 4A:
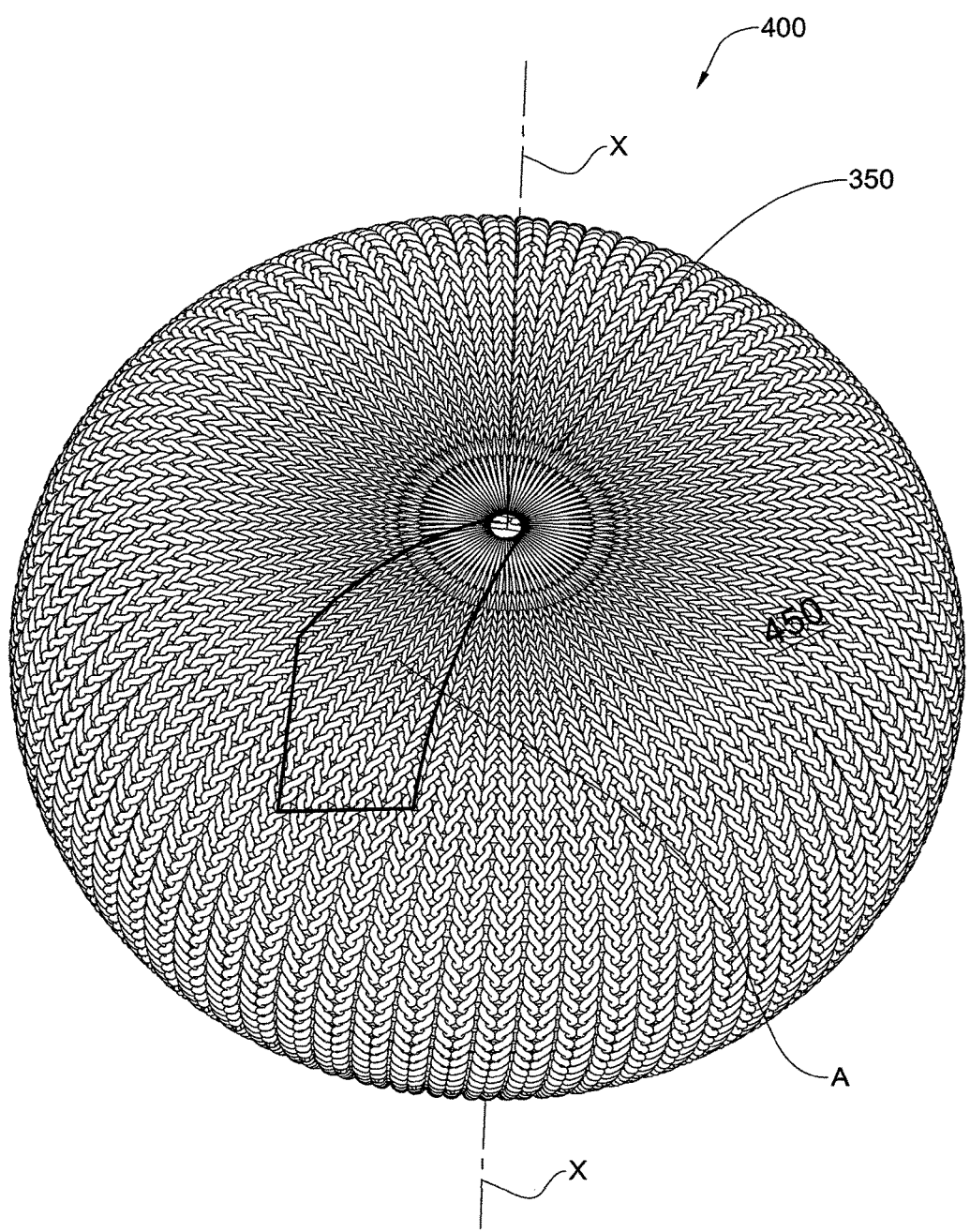
FIGS. 4A and 4B illustrate a seating pouf in accordance with the disclosed subject matter in a top perspective view and a top view, respectively.
Figure 4B:
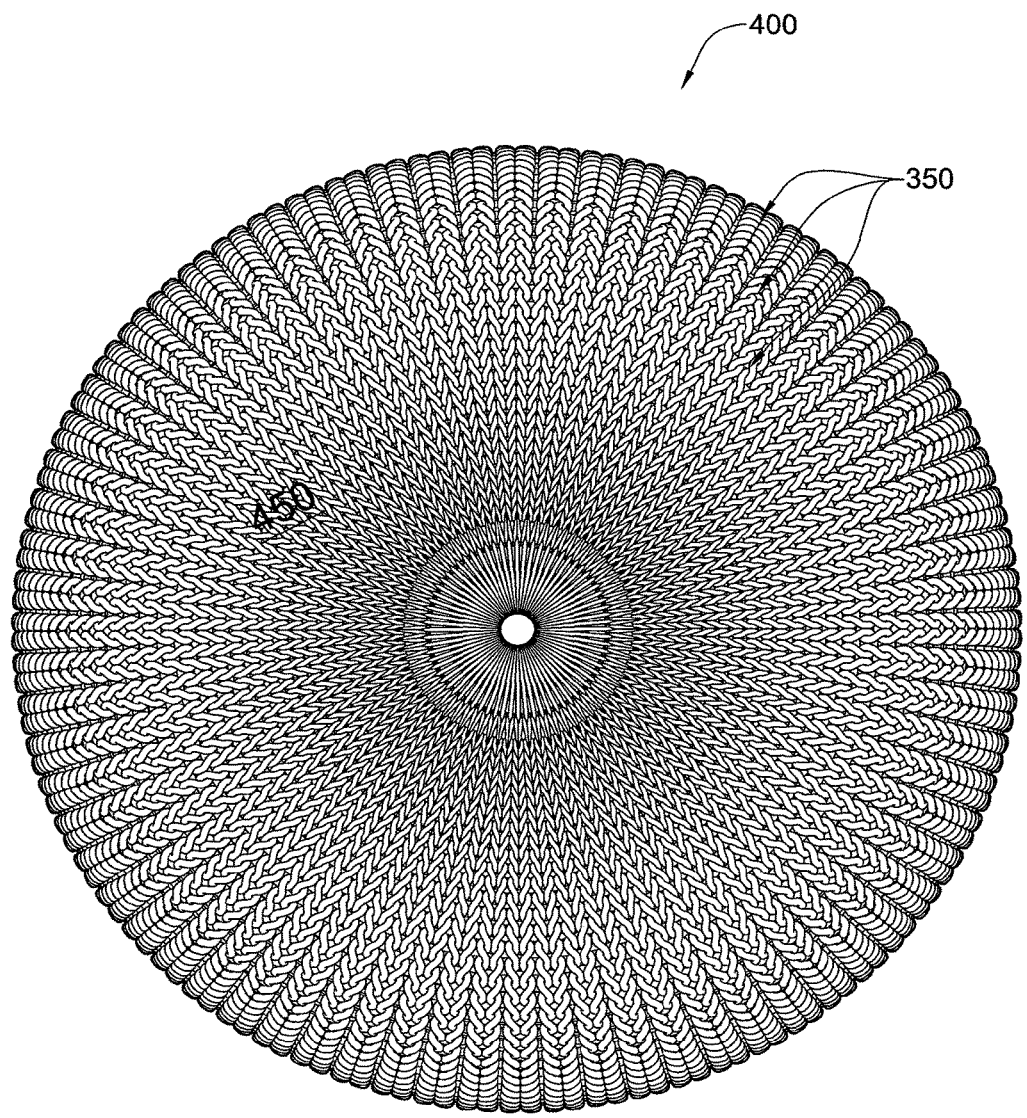
Figure 5:
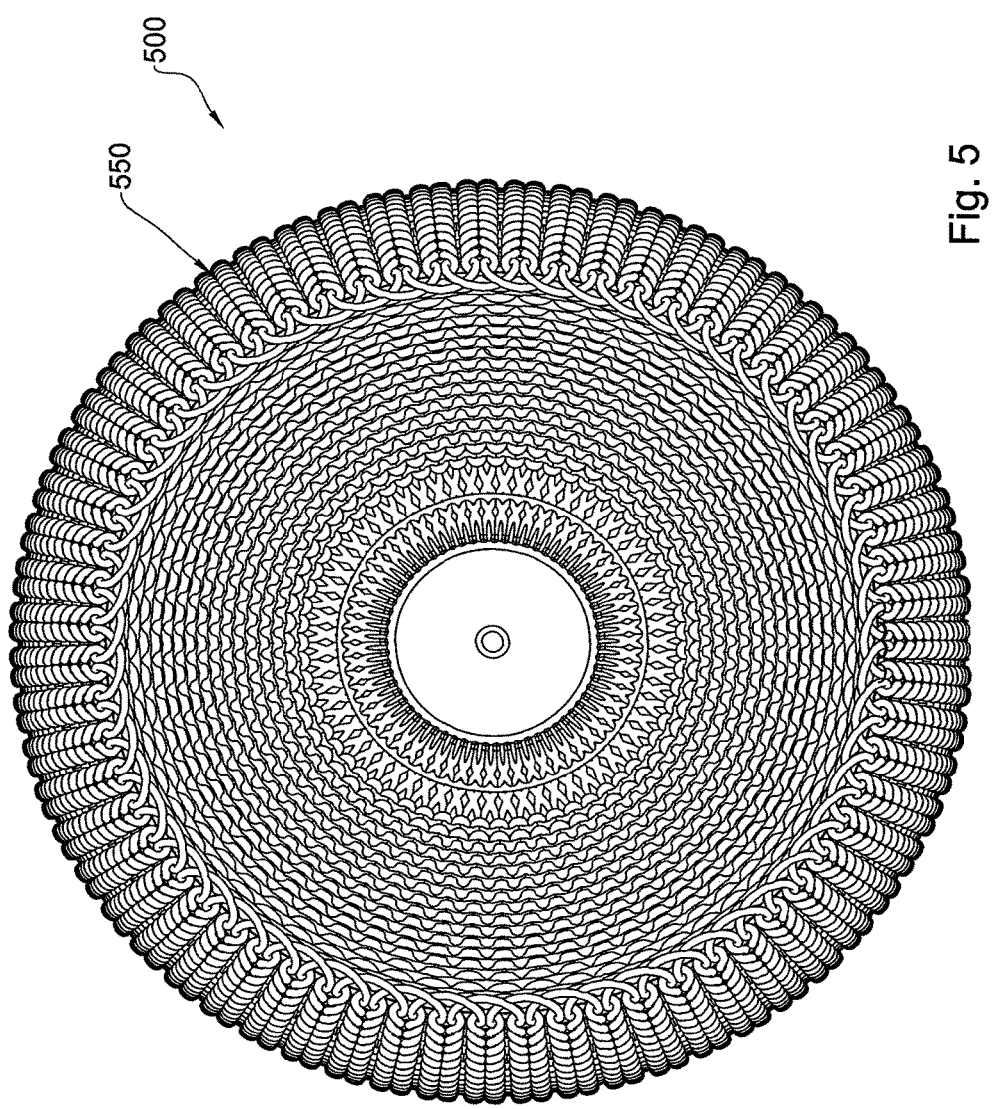
FIG. 5 illustrates a bottom view of an article in accordance with another example of the disclosed subject matter.

Attention is further directed to FIGS. 3 to 5, illustrating a curved, non planar, articles and segment thereof formed with knit-like surface panels, the articles having a non planar, curved surfaces.

While the panels and articles in FIGS. 3 to 5 have curved configuration, the above described characteristics of the panel are maintained. The panels are molded into the desired shape along with the knit like pattern in a single process, e.g. injection molded. The illustrated panel and the articles are made from rigid plastic material. As disclosed with reference to FIG. 2 above, the knit pattern can change along the panel surface without however substantially deforming the knit-like pattern by loosening of tightening the strands as would be the case in the a traditional natural knitting process. FIG. 3 illustrates a segment of a curved panel generally designated 300 provided to allow close observation of the continuity of the knit column, comprised of a knit stitches. The panel 300 is a segment A in FIG. 4A illustrating a seating pouf 400 which resembles a knitted pouf. However, unlike with the typical knitted pouf which would require staffing the knitted shell of the pouf to provide it with the desired volume to provide it with a three dimensional shape, the pouf 400 in FIG. 4A and FIG. 4B is made from injection molded plastic material, having a sufficient rigidity to carry a load e.g. of a seated person. It is noticeable that the outer surface 450 of the pouf has a knit like surface constituted by a curved panel in accordance with the disclosed subject matter. The knitted surface 450 is comprises of curved columns 350 of knit stitches (one such column highlighted in FIG. 3 for ease of description) connected to each other by integrally molded connecting members 330. The plurality of radially extending curved columns 350 defining the outer surface 450 of the pouf 400 remain constant in number from the start of the knit pattern to the end thereof. This is facilitated by planning each such column to expand in its width to adapt to the curvature and the changing radii of the pouf around its longitudinal axis X. As will be appreciated by those skilled in the art of knitting, such a pattern would not be possible in natural knitting process as planning a curvature and radii extension entails increasing the number of stitches, i.e. adding at least one column to the number of columns every few rows, which would not maintain the symmetry of the knit pattern observable on the article in FIG. 4A as well as FIG. 5. The decrease in raddi would entail decrease in the number of columns, which in accordance with the disclosed subject matter is possible by planning of the opening between the strands of the stitches such that the larger the opening wider the stitch. Nevertheless, the structural integrity of the entire panel and the article is maintained without distortion due to the base layer of the panel carrying the tactile, knit like surface layer.

FIG. 5 illustrates a different pattern on knit like pattern over the article 500. Yet again, it will be observed that the number of knit stitch columns 550 is maintained constant while the width of the stitches in each row gradually increases and decreases as required to follow the curvature and increase in radii of the article. As indicated above, this would not be possible in a typical knitting process. Moreover, the article 500 comprises sealed portions 570, having no opening in the panels' base layer (not seen).

While the disclosed subject matter, has been discussed and illustrated with respect to specific knit patterns and shapes of articles, and many details thereof have been presented for the purposes of illustration, it will be apparent to those skilled in the art that the disclosed subject matter is susceptible to additional variations and certain details described can vary without departing from the basic principles of the disclosed subject matter.

The invention claimed is:

1. An injection molded polymeric panel having at least one surface resembling a knit-like pattern comprising a polymeric three-dimensional structure resembling interwoven yarn knitted-stitches, said three-dimensional structure having a knit-like structure comprising a plurality of stitches at least partially interconnected through connecting members forming together said knit-like pattern, wherein at locations where the stitch strand and the connecting member intersect they form together an integrated, solid integrally-molded material location, and wherein the panel comprises through going apertures extending therethrough, the panel being a unitary-molded panel.

2. The molded panel in accordance with claim 1, wherein the panel comprises a base layer configured to provide the panel with its structural continuity and a three dimensional, protruding from the base, tactile layer at least over one face thereof, constituted by stitch patterns on the at least one face of the panel and providing the panel with a knit-like visual effect, wherein the base layer is at least partially perforated, with the perforations being constituted by the space in-between the connecting members of the knit pattern.

3. The molded panel in accordance with claim 2, wherein the base layer is at least partially constituted by at least the connecting members extending between the stitches at least in each row of the pattern.

4. The molded panel in accordance with claim 2, wherein the knit-like stitches on the tactile layer are arranged in columns, having a varying knit-like pattern with a gradually expanding spacing in each stitch of the same longitudinal strap constituting a knit column, said columns being interconnected with the adjacent column on either side through the connecting members.

5. The molded panel in accordance with claim 2, the panel having two similar faces.

6. The molded panel in accordance with claim 2, the panel having two faces fitted with tactile layer, each layer mimicking a different pattern of knitted surface.

7. The molded panel in accordance with claim 2, wherein the knit like pattern is integrally molded with a frame having a non knit-like surface.

8. The molded panel in accordance with claim 1, wherein the panel is molded in different three-dimensional shapes.

9. The molded panel in accordance with claim 1, wherein forces over the knit stitches and their interconnecting strands are substantially homogenously distributed.

10. The molded panel in accordance with claim 1, wherein the knit-like pattern is comprised of a plurality of curved columns of knit stitches connected to each other by integrally molded connecting members, the plurality of curved columns defining the outer surface remain constant in number from the start of the knit-like pattern to the end thereof and wherein the through going apertures are constituted by the space in-between the connecting members of the knit pattern.

11. The molded panel in accordance with claim 2, wherein the molded panel comprises a knit-like surface having an axial stability, such that the knit-like tactile layer maintains its knit-like pattern having generally same geometrical structure and dimensions, when deformed.

12. The molded panel in accordance with claim 2, wherein the at least one tactile layer resembles a yarn knitted stitches in any desired knitting pattern.

13. A molded hollow article, having at least one surface resembling a knit-like pattern, wherein the article has a three dimensional spatial configuration having a sufficient rigidity to carry a load thereon wherein the knit-like pattern is constituted by a panel in accordance with claim 1 having a curved shape.

14. The molded hollow article in accordance with claim 13, wherein the knit-like pattern is comprised of a plurality of curved columns of knit stitches connected to each other by integrally molded connecting members, the plurality of curved columns defining the outer surface remain constant in number from the start of the knit pattern to the end thereof.

15. The molded hollow article in accordance with claim 13, wherein the number of knit stitch columns is maintained constant while the width of the stitches in each row gradually increases and decreases as required to follow the curvature of the three dimensional shape.

* * * * *